United States Patent [19]
Rhyne, Jr.

[11] Patent Number: 5,234,165
[45] Date of Patent: Aug. 10, 1993

[54] AGRICULTURAL SPRAYERS

[75] Inventor: Hoffman Rhyne, Jr., Benton, Ala.

[73] Assignee: Tri-Tech Services, Inc., Benton, Ala.

[21] Appl. No.: 841,092

[22] Filed: Feb. 25, 1992

[51] Int. Cl.⁵ .............................................. B01D 27/00
[52] U.S. Cl. .................................. 239/127; 239/575;
210/333.1
[58] Field of Search ............... 239/172, 124, 127, 575,
239/590, DIG. 23; 210/332, 333.1, 340, 416.1,
411, 252, 253, 256

[56] References Cited

U.S. PATENT DOCUMENTS

| | | | |
|---|---|---|---|
| 2,271,814 | 2/1942 | Coolidge | 210/333.1 |
| 3,221,888 | 12/1965 | Muller | 210/333.1 |
| 3,623,661 | 11/1971 | Wagner | 239/127 |
| 4,197,995 | 4/1980 | Campbell et al. | 239/127 X |
| 4,755,290 | 7/1988 | Neuman et al. | 210/333.1 X |

Primary Examiner—Andres Kashnikow
Assistant Examiner—Kevin P. Weldon
Attorney, Agent, or Firm—Veal & Associates

[57] ABSTRACT

An improvement in agricultural sprayers having a reservoir, a pump, a discharge line, one or more valves for directing the flow of fluid to either a first or second flow line, one or more filter heads connected to the first and second flow lines and one or more spray nozzles, each connected to a filter head. One or more valves are provided to selectively connect either of the first or second flow lines to a return line which is connected to the reservoir. The filter head comprises a first conduit connected to the first flow line. The first conduit has a first filter seated therein. A second conduit having a second filter seated therein is connected to the second flow line and a third conduit is connected to and in communication with the first and second conduits and a spray nozzle.

15 Claims, 2 Drawing Sheets

AGRICULTURAL SPRAYERS

FIELD OF THE INVENTION

The present invention relates to agricultural sprayers and more particularly to agricultural sprayers having filtration systems for collecting solid matter suspended within the fluid to be sprayed. In greater particularity, the present invention relates to agricultural sprayers having self-cleaning filtration systems.

BACKGROUND OF THE INVENTION

The vast majority of large farming operations use liquid spray equipment to apply fertilizer, insecticide, and herbicide. Such spray equipment may be mounted on a tractor or self propelled. The basic system includes a tank in which the fluid to be sprayed is contained, a pump for discharging the fluid from the tank, spray nozzles, mounts for the spray nozzles and hoses connecting the pump to the spray nozzles. These systems are "single-line" with the lines dead ending at the nozzles. Most systems are equipped with a primary filter, generally located near the outlet port of the pump, which is designed to trap the solid debris that is almost always found in agricultural chemicals before such debris reaches the spray nozzles. If the debris reaches the spray nozzles the result is typically a blockage of the nozzles or eventual damage of the nozzle from abrasive wear. Due to the excessive amount of debris which contaminates agricultural chemicals as they are being applied and the large volume of fluid sprayed by such systems, the primary filters are very porous and allow particles through the filter that could partially block or wear the spray nozzles. Thus, in addition to the primary filter, most systems also have a secondary filter at each spray nozzle for capturing the smaller debris passing through the primary filter. The problem with the secondary filter is that they are prone to rapidly clog, causing lost productivity while the secondary filters are cleaned.

SUMMARY OF THE INVENTION

It is the principal object of the present invention to provide an improved agricultural sprayer having both primary and secondary filters wherein the secondary filters are automatically cleaned without interrupting the spraying process.

In support of the principal object, another object of the present invention is to provide a sprayer having self-cleaning spray tips or nozzles that do not require adjustment or cleaning by the operator and accordingly increase productivity and minimize the exposure of the operator to the toxic chemicals discharged by the sprayer.

Another object of the invention is to provide a consistent discharge of chemicals from each sprayer thus facilitating an even application of such chemicals to the area to be sprayed.

This and other objects and advantages of our invention are accomplished through the use of a first valve system for alternating the flow of fluid into either a first or second flow line, both of which are connected to one or more filter heads. The filter heads have a first conduit connected to the first flow line and a second conduit connected to the second flow line. First and second filters are seated within the first and second conduits, respectively. A third conduit is in communication with the first and second conduits and is connected to a spray nozzle.

During operation fluid is pumped from a reservoir through a primary filter and into the first flow line which conveys the fluid into the first conduit of the filter head. The fluid passes through the first filter to remove solids and a portion of the liquid flows through the spray nozzle. The pump discharges fluid at a rate greater than the maximum rate at which fluid may pass through the spray nozzle; accordingly, a portion of the fluid passes through the second filter and exits the filter housing through the second flow line. A second valve system is provided for selectively connecting either the first or second flow line to a return line which is connected to the reservoir. If fluid is discharged from the pump and into the first flow line, the second valve system is operated to permit fluid exiting the filter head through the second flow line to enter the return line and flow to the reservoir. After a selected time period, the first and second valve systems are alternated to facilitate a flow of fluid from the pump and into the second flow line. The fluid thus travels through the second filter and a portion is discharged through the sprayer nozzle. The remainder passes through the first filter and removes debris captured by the first filter when the flow of fluid from the pump was initially directed through the first conduit. The remaining fluid and debris pass through the first flow line, through the return line and into the reservoir. The process of alternating the flow through the first and second flow lines is repeated throughout the spraying operation with the debris captured by the secondary filters being collected in the reservoir. When the spraying is complete, the reservoir can be cleaned. Usually, several days of spraying may be conducted before the tank requires cleaning.

BRIEF DESCRIPTION OF THE DRAWINGS

Apparatus embodying features of our invention are depicted in the accompanying drawings which form a portion of this disclosure and wherein.

DESCRIPTION OF A PREFERRED EMBODIMENT

Figure 1:
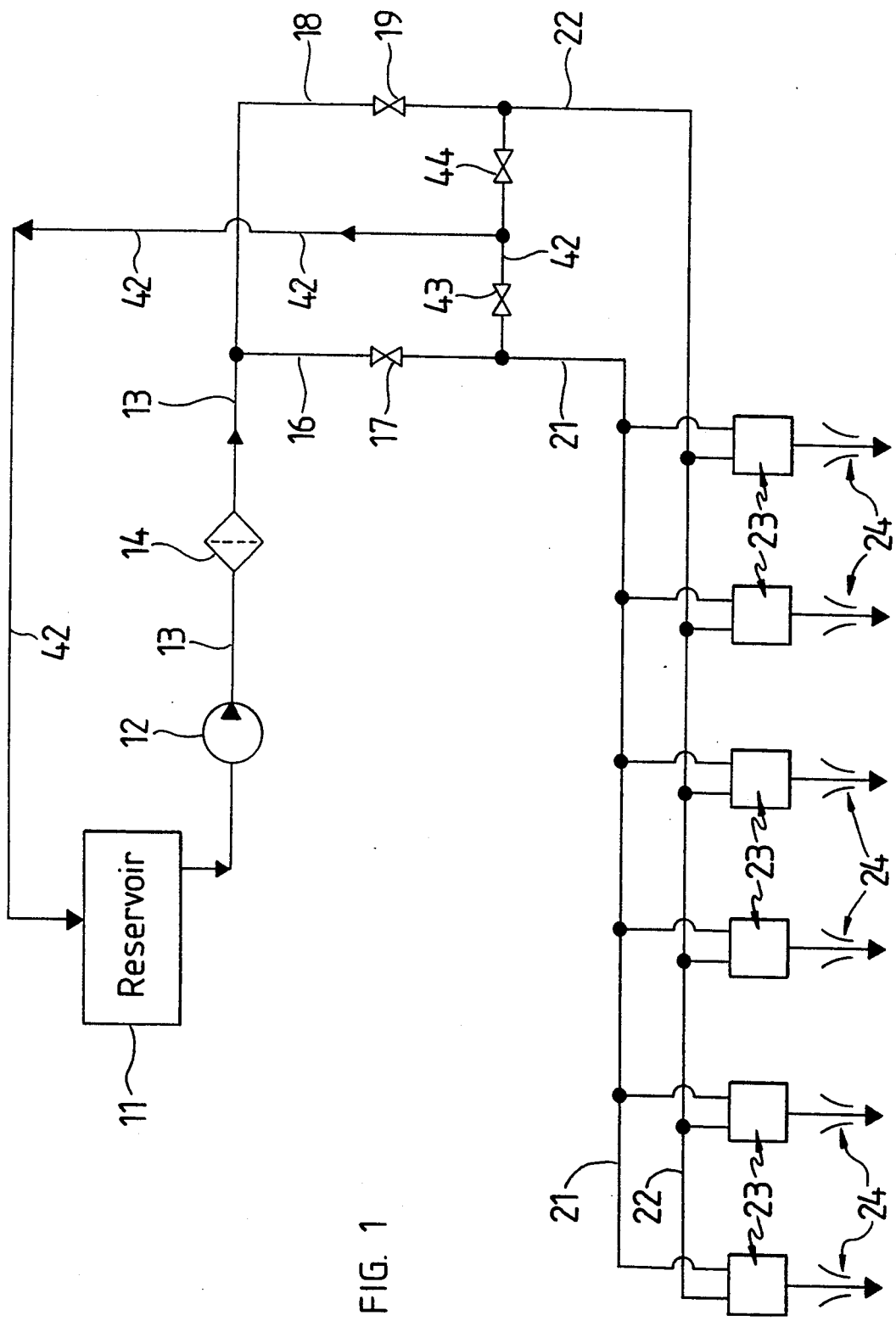
FIG. 1 is a schematic drawing of the present invention.

Referring to the drawings for a clearer understanding of the invention, it should be noted from FIG. 1 that the present invention contemplates the use of a reservoir or tank 11 in which a quantity of fluid (not shown) is contained. A pump 12 is connected to the reservoir 11 for discharging the fluid through a primary discharge line 13. A primary filter 14 is connected to and in communication with the primary discharge line 13 for capturing the bulk of solid debris typically suspended in the fluid. The primary filter 14 is very porous and thus allows some of the more minute particles of debris to pass through. A first auxiliary discharge line 16 is connected to and in communication with the primary discharge line 13 downstream of primary filter 14 and has a first discharge valve 17 for selectively opening and closing the first auxiliary line 16. A second auxiliary discharge line 18 is connected to and in communication with the primary discharge line 13 downstream of primary filter 14 and has a second discharge valve 19 for selectively opening and closing the second auxiliary discharge line 18. A first flow line 21 is connected to and in communication with the first auxiliary discharge line 16. A second flow line 22 is connected to and in communication with the second auxiliary discharge line 18. The first and second auxiliary discharge lines 16 and 18 and the corresponding discharge valves 17 and 19 serve as a means for selectively channeling fluid, discharged from the pump 12, to either the first or second flow lines 21 and 22 for reasons set forth herein. One skilled in the art will recognize that a three-way valve connected to the primary discharge line 13, first auxiliary discharge line 16 and second discharge auxiliary line 18 would serve the function of the first and second discharge valves 17 and 19. It may also be noted that the valve may be controlled by a timer or by the volume of fluid which has passed therethrough, or by increased line pressure due to a clogged secondary filter. The first and second flow lines 21 and 22 are each connected to and in communication with each of a plurality of filter heads 23. The filter heads 23 are each connected to and in communication with one of a plurality of spray nozzles 24.

Figure 2:
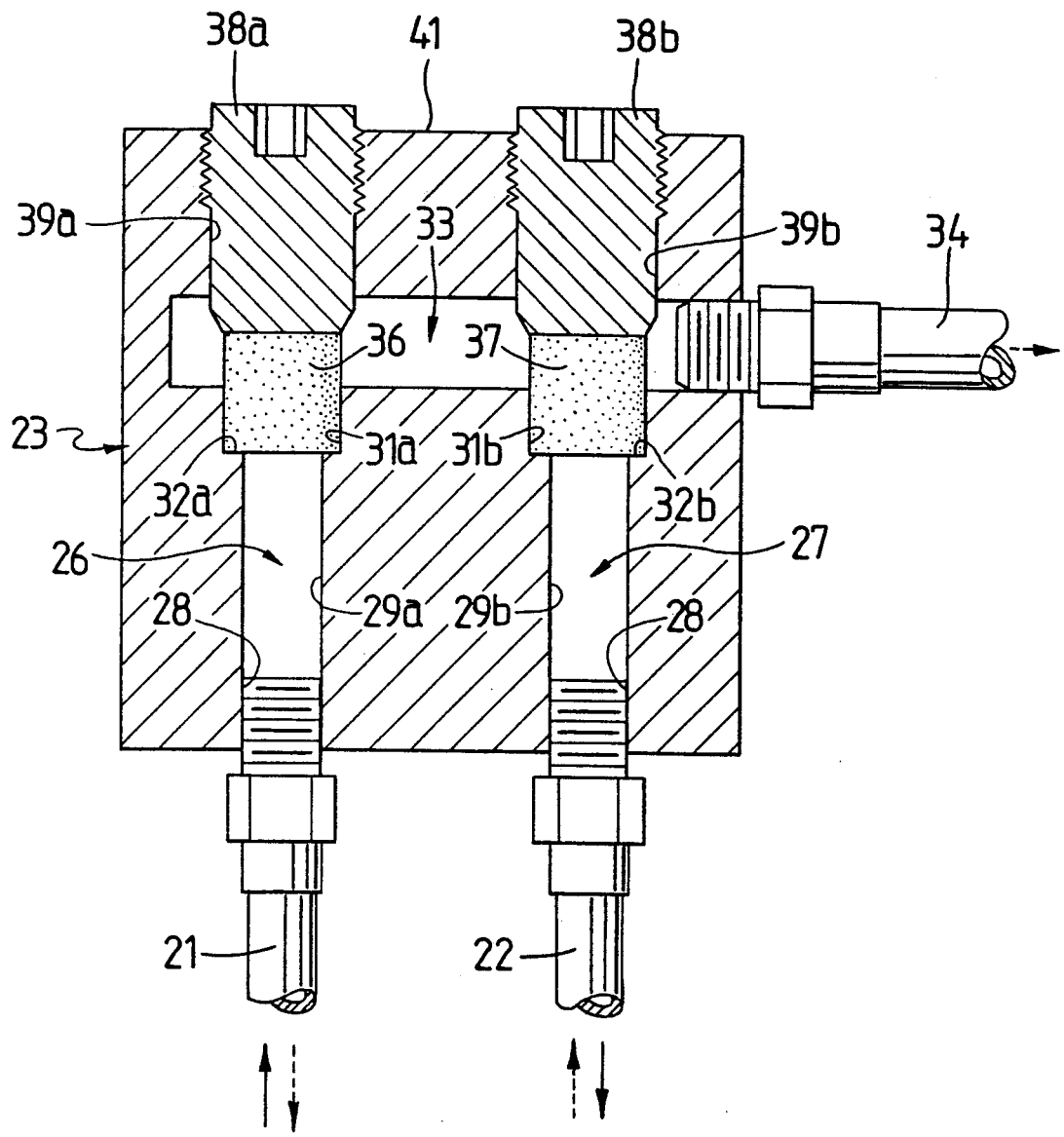
FIG. 2 is a sectional side elevational view of a filter head.

As shown in FIG. 2, the filter head 23 includes a first conduit 26 and a second conduit 27 parallel to the first conduit 26. The first and second flow lines 21 and 22 are connected to and in communication with the conduits 26 and 27 is tapped to threadably engage the corresponding flow line 21 and 22. The first and second conduits 26 and 27 each include an elongated portion 29a and 29b, respectively, beginning at the lower end 28 and an enlarged diameter portion 31a and 31b, respectively, connected to and in communication with the elongated portions. Shoulders 32a and 32b are formed adjacent the connection of the portions 29a and 29b and 31a and 32b, respectively. A third conduit 33 extending perpendicularly to the first and second conduits 26 and 27 is connected to an in communication with the enlarged diameter portions 31a and 31b. A spray nozzle 24 is connected to and in communication with a connector hose 34 which is threadably connected to and in communication with the third conduit 33. A first filter 36 is seated within the enlarged diameter portion 31a of the first conduit 26. A second filter 37 is seated within the enlarged diameter portion 31b of the second conduit 27. The first and second filters 36 and 37 extend partially within the third conduit 33 and are secured within the enlarged diameter portions 31a and 31b, respectively, by first and second filter retrieval plugs 38a and 38b. The filter retrieval plugs 38a and 38b are threadably engaged within first and second filter retrieval bores 39a and 39b extend from an upper surface 41 of the filter head 23 in coaxial relation to the first and second conduits 26 and 27 and in communication with the third conduit 33. The filter retrieval plugs 38a and 38b, when tightened against the filters 36 and 37 urge the filters against shoulders 32a and 32b and, thus, secure the filters within the first and second conduits 26 and 27. The filters 36 and 37 and plugs 38a and 38b have a large diameter then the third conduit 33 and, accordingly, fluid moving through the third conduit 33 will pass through at least one of the two filters.

In operation, the pump 12 is operated at a speed sufficient to pump the fluid at a rate greater than the maximum rate at which the fluid can pass through the spray nozzle 24. This results in a backup pressure within the filter head 23 such that a portion of the fluid entering the filter head 23 through one flow line will exit through the spray nozzle while the remainder exits through the other flow line. Initially the first discharge valve 17 is opened and the second discharge valve 19 is closed in order that fluid is pumped from the primary discharge line 13, through the first auxiliary discharge line 16, into the first flow line 21. As previously mentioned, the primary filter 14 will capture the larger debris suspended in the fluid; however, the fluid entering the first flow line 21 will contain some smaller particles of debris. These smaller particles are captured by the first filter 36 as the cleaned fluid passes into the conduit 33. A portion of the cleaned fluid is discharged from the spray nozzle 24 while the remainder of the fluid passes through the second filter 37 and into the second flow line 22. As is shown in FIG. 1, a return line 42 is connected to and in communication with the first and second flow lines 21 and 22 and has third and fourth return valves 43 and 44 for selectively opening and closing the return line 42. Return line 42 is connected to and in communication with the reservoir 11. When the first valve 17 is open to permit the flow of fluid from the primary discharge line 13, through the first auxiliary discharge line 16, into the first flow line 21, the third return valve 43 is closed and the fourth return valve 44 is opened such that fluid flowing from the filter head 23 through the second flow line 22 may pass through the return line 42 to the reservoir 11. The use of a single four-way valve (not shown) connected to the first and second flow lines and to the return line is contemplated as an alternative to the first, second, third, and fourth valves. Eventually the small particles of debris will accumulate on the first filter 36 and begin to block the flow of fluid therepast. At this point the first discharge valve 17 will be closed and the second discharge valve 19 opened such that fluid may flow from the primary discharge line 13, through the second auxiliary discharge line 18, into the second flow line 22. The third return valve 43 is opened and the fourth return valve 44 is closed in order that fluid entering the first flow line 21 from the filter head 23 may flow through the return line 42 to the reservoir 11. By reversing the flow of fluid through the filter head 23, debris is removed from the first filter 36 and transported to the reservoir. The second filter 37 captures additional debris conveyed by the fluid passing into the filter head 23 such that only clean fluid is discharged from the spray nozzle 24. During the spraying process, the direction of flow is repeatedly reversed to clean the filters and maintain a consistent flow of fluid. The debris captured by the filters collects in the reservoir 11 and after a period of spraying, usually several days, the reservoir is cleaned. From the foregoing, it should be clear that the present apparatus represents a substantial improvement over the prior art.

While we have shown our invention in one form, it will be obvious to those skilled in the art that it is not so limited but is susceptible of various changes and modifications without departing from the spirit thereof.

What we claim is:

1. An improvement in agricultural sprayers having a reservoir for containing a quantity of fluid, a primary discharge line connected to and in communication with said reservoir, and a pump connected to said primary discharge line for discharging said fluid through one or more spray nozzles, said improvement comprising:

(a) first valve means, connected to and in communication with said primary discharge line and to a first flow line and a second flow line, for selectively channeling the flow of fluid from said primary discharge line to either said first or second flow line;

(b) a second valve means, connected to and in communication with said first and second flow lines and to a return line, for selectively connecting either said first flow line or said second flow line in communication with said return line; and (c) one or more filter heads, each having a first conduit connected to and in fluid communication with said first flow line, a second conduit connected to and in fluid communication with said second flow line, a third conduit connected to and in fluid communication with said first and second conduits and said spray nozzle, and a filter means seated within said first and second conduits for filtering fluid introduced within said filter head through either said first or second flow lines, wherein said pump discharges fluid at a rate greater than the maximum flow rate at which fluid may pass through said spray nozzles resulting in a backup pressure within the filter head such that a portion of said fluid introduced within said filter head through a selected one of said first and second conduits will pass through said spray nozzle while the remainder of said fluid exits said filter head through a remaining other of said first and second conduits.

2. An improvement as defined in claim 1 wherein said first valve means comprises:

(a) a first auxiliary discharge line connected to and in communication with said primary discharge line and said first flow line and having a first discharge valve for selectively opening and closing said first auxiliary discharge line; and (b) a second auxiliary discharge line connected to and in communication with said primary discharge line and said second flow line and having a second discharge valve for selectively opening and closing said second auxiliary discharge line.

3. An improvement as defined in claim 2 wherein said second valve means comprises third and fourth return valves for selectively opening and closing said return line, wherein said return line is intermediate and connected to said first and second flow lines by said third and fourth return valves.

4. An improvement as defined in claim 1 wherein said filter means comprises a first filter seated within said first conduit and a second filter seated within said second conduit.

5. An improvement as defined in claim 4 wherein said filter head further comprises:

(a) a first filter retrieval bore, extending through said filter head in coaxial relation to said first conduit and connected to and in communication with said third conduit, through which said first filter is inserted within said first conduit, wherein a portion of said first filter retrieval bore is threaded to accommodate threaded engagement of a first filter plug which, when received within said first filter retrieval bore, abuts said first filter to secure said first filter within said first conduit; and (b) a second filter retrieval bore, extending through said filter head in coaxial relation to said second conduit and connected to and in communication with said third conduit, through which said second filter is inserted within said first conduit, wherein a portion of said second filter retrieval bore is threaded to accommodate threaded engagement of a second filter plug which, when received within said second filter retrieval bore, abuts said second filter to secure said second filter within said second conduit.

6. An improvement as defined in claim 5 wherein said first and second conduits each define an elongated portion and an enlarged diameter portion connected to and in communication with said elongated portion and said third conduit such that said first and second filters are received within said enlarged diameter portions and abut a shoulder defined therein, and block said third conduit such that fluid moving through said third conduit must pass through either said first or second filters.

7. An improvement in agricultural sprayers having a reservoir in which a quantity of fluid is contained and a pump connected to said reservoir for discharging said fluid through either a first flow line or a second flow line, said improvement comprising:

(a) first valve means connected to and in communication with said pump, said first flow line and said second flow line for selectively channeling the flow of fluid from said pump to either said first or second flow line; and (b) one or more filter heads, each having a first conduit connected to and in communication with said first flow line, a second conduit connected to and in communication with said second flow line, a third conduit connected to and in communication with said first an second conduits and a spray nozzle, and filter means seated within said first and second conduits for filtering fluid introduced within said filter head through either said first or second flow lines, wherein said pump discharges fluid at a rate greater than the maximum flow rate at which fluid may pass through said spray nozzles such that a portion of said fluid introduced within said filter head through a selected one of said first and second conduits will pass through said spray nozzle while the remainder of said fluid exits said filter head through a remaining other of said first and second conduits.

8. An improvement as defined in claim 7 wherein said filter means comprises a first filter seated within said first conduit and a second filter seated within said second conduit.

9. An improvement as defined in claim 8 wherein said filter head further comprises:

(a) a first filter retrieval bore, extending through said filter head in coaxial relation to said first conduit and connected to and in communication with said third conduit, through which said first filter is inserted within said first conduit, wherein a portion of said first filter retrieval bore is threaded to accommodate threaded engagement of a first filter plug which, when received within said first filter retrieval bore, abuts said first filter to secure said first filter within said first conduit; and (b) a second filter retrieval bore, extending through said filter head in coaxial relation to said second conduit and connected to and in communication with said third conduit, through which said second filter is inserted within said second conduit, wherein a portion of said second filter retrieval bore is threaded to accommodate threaded engagement of a second filter plug which, when received within said second filter retrieval bore, abuts said second filter to secure said second filter within said second conduit.

10. An improvement as defined in claim 9 wherein said first and second conduits each define an elongated portion and an enlarged diameter portion connected to and in communication with said elongated portion and said third conduit such that said first and second filters are received within said enlarged diameter portions and rest on a shoulder defined therein, wherein said first and second filters are held adjacent said third conduit by said first and second filter plugs, to block said third conduit such that fluid moving through said third conduit must pass through either said first or second filters.

11. An improvement as defined in claim 7 further comprising a second valve means, connected to and in communication with said first and second flow lines and a return line connected to and in communication with said reservoir for alternatively connecting either said first flow line or said second flow line in communication with said return line.

12. An improvement as defined in claim 11 wherein said first valve means comprises:
   (a) a first auxiliary line connected to and in communication with a primary discharge line and said first flow line and having a first discharge valve for selectively opening and closing said first auxiliary discharge line; and
   (b) a second auxiliary discharge line connected to and in communication with said primary discharge line and said second flow line and having a second discharge valve for selectively opening and closing said second auxiliary discharge line.

13. An improvement as defined in claim 12 wherein said second valve means comprises third and fourth return valves for selectively connecting said return line to and in communication with either said first or second flow lines.

14. An improvement in agricultural sprayers having a reservoir for containing a quantity of fluid, a primary discharge line connected to and in communication with said reservoir, a primary filter connected to and in communication with said primary discharge line, and a pump connected to said primary discharge line for discharging said fluid through one or more spray nozzles, said improvement comprising:
   (a) valve means connected to and in communication with said primary discharge line, first and second flow lines, and a return line for selectively channeling the flow of fluid from said primary discharge line to either said first or second flow line and for selectively connecting either said first flow line or said second flow line in communication with said return line; and
   (b) one or more filter heads, each having a first conduit connected to and in communication with said first flow line, a second conduit connected to and in communication with said second flow line, a third conduit connected to and in communication with said first and second conduits and said spray nozzle, and filter means seated within said first and second conduits for filtering fluid introduced within said filter head through either said first or second flow lines, wherein said pump discharges fluid at a rate greater than the maximum flow rate at which fluid may pass through said spray nozzles such that a portion of said fluid introduced within said filter head through a selected one of said first and second conduits will pass through said spray nozzle while the remainder of said fluid exits said filter head through a remaining other of said first and second conduits.

15. An improvement as defined in claim 14 wherein said valve means includes a four-way valve connected to said primary discharge line, said first and second flow lines and said return line.

* * * * *